US006293309B1

(12) United States Patent
Lim

(10) Patent No.: US 6,293,309 B1
(45) Date of Patent: Sep. 25, 2001

(54) CONTROL VALVE APPARATUS

(75) Inventor: Kok Yong Lim, Singapore (SG)

(73) Assignee: Twinwood Engineering Ltd (SG)

( * ) Notice: Subject to any disclaimer, the term of this patent is extended or adjusted under 35 U.S.C. 154(b) by 0 days.

(21) Appl. No.: 09/242,916

(22) PCT Filed: Aug. 29, 1996

(86) PCT No.: PCT/SG96/00011

§ 371 Date: Apr. 19, 1999

§ 102(e) Date: Apr. 19, 1999

(87) PCT Pub. No.: WO98/08657

PCT Pub. Date: Mar. 5, 1998

(51) Int. Cl.[7] ............................ B25D 9/14; F16K 31/122

(52) U.S. Cl. .................................. 137/627.5; 137/596.18

(58) Field of Search ............................ 137/627.5, 596.18; 91/469, 446, 461

(56) References Cited

U.S. PATENT DOCUMENTS

| | | | | |
|---|---|---|---|---|
| 3,568,571 | * | 3/1971 | Hoen et al. | 137/596.18 |
| 3,628,571 | * | 12/1971 | Buchschlag et al. | 137/627.5 |
| 5,442,992 | * | 8/1995 | Sanner et al. | 91/428 |

* cited by examiner

*Primary Examiner*—John Rivell
*Assistant Examiner*—Ramesh Krishnamurthy
(74) *Attorney, Agent, or Firm*—Akerman Senterfitt

(57) ABSTRACT

The invention relates to a control valve apparatus (1) providing reciprocal motion, comprising a spool (2) and sleeve (3), a passage (4) for fluid, which is hydraulic fluid in the embodiment, the passage (4) being openable and closable by the spool (2) and sleeve (3), ports (A, B, C) for fluid, and at least one seal (5, 6), the arrangement being such that a seat of one seal (5) reacts with a seat of another (6) whereby to open the another seal (6).

16 Claims, 3 Drawing Sheets

CONTROL VALVE APPARATUS

The invention relates to a control valve apparatus, particularly to hydraulic directional control valves which in operation allows hydraulic fluid, usually oil, to perform a required function by shutting off one fluid port and opening another.

Such valves are often used in heavy machining, where components are required to be moved quickly, with consequent large momentum. Such valves therefore often find application in machinery such as a piling hammer. In such an application, switching of the control valve from one direction of flow to another is required to take place as quickly as possible in order to eliminate cavitation beneath a piston and to prevent a high pressure "spike" being generated on the other side of the piston by the large momentum of the moving parts. The control valve has to command the hammer to accelerate upwards, to retard it to zero velocity, and then to drop it under gravitational influence. These requirements have been previously achieved by passing metallic piston rings over open ports using a pair of piston rings, one to close and one to open. Generally this type of control valve works satisfactorily but it has the disadvantage in that eventually the metallic rings tend to break up, especially if no preventative maintenance is performed, and also to piston rings perform only a partial seal. Pieces of broken ring then migrate around the system until they finally end up in a filter of the system. In the process of such migration much consequential damage can be effected, leading to excessive downtime for repair and maintenance, which is expensive on time and equipment.

It is accordingly an object of the invention to seek to mitigate these disadvantages.

According to a first aspect of the invention there is provided a control valve apparatus providing reciprocal motion, comprising a spool and sleeve, a passage for fluid which is openable and closable by the spool and sleeve, ports for fluid, and at least one seal, the arrangement being such that a seat of one seal reacts with a seat of another seal, whereby to open the another seal.

Thus using the invention it is possible to provide substantially instantaneous switching, with no "overlapping" or "underlapping".

There may be a seat device whereby the spool and sleeve are engageable for cutting off flow of fluid to the passage. This provides for substantially instantaneous cut-off of fluid particularly where the seat device may comprise a groove in the spool in which a nose of the sleeve may be received.

The groove and nose may have cooperable sealing surfaces. This seeks to obviate leakage, without requirement for additional seals.

The seating surfaces may be inclined surfaces. This provides for ease of construction, in that machining of the surfaces is relatively straightforward.

The spool may have a nose adapted for sealing cooperation with a seat of the seal, for cutting off fluid flow from the passage to a fluid port. This provides a relatively simple construction.

The seat of the seal and a nose of the spool may have cooperable inclined surfaces for effecting sealing. This again provides for relative ease of construction.

The ports may have relatively large cross-sectional are in relation to the fluid flow passage whereby to obviate building up of back fluid pressure. This seeks to ensure instantaneous operation.

There may be a low pressure port, a high pressure inlet port, and a pilot pressure inlet port. This arrangement provides for adequate control, particularly when the fluid may be a hydraulic fluid.

The sleeve may have a body, which body may have parts of different diameter, whereby a substantially constant (backward) force is applied to the sleeve, at system pressure. This provides for positive control, particularly when the spool may have a face exposed to hydraulic fluid which is of an area to provide substantially constant force to the spool in the forward direction, at system pressure.

The or each seal may be non-metallic. This arrangement can ensure that even in the event of failure, migration of valve apparatus seal ports will not cause damage to the apparatus as a whole, particularly when the or each seal may comprise a plastic material.

There may be separate seal(s) and port(s) whereby no port is scanned by any seal.

According to a second aspect of the invention there is provided valve apparatus as hereinbefore defined, in combination with a reciprocable device.

The reciprocable device may comprise a hydraulic piling hammer.

Control valve apparatus embodying the invention is hereinafter described, by way of example, with reference to the accompanying drawings.

Figure 1:
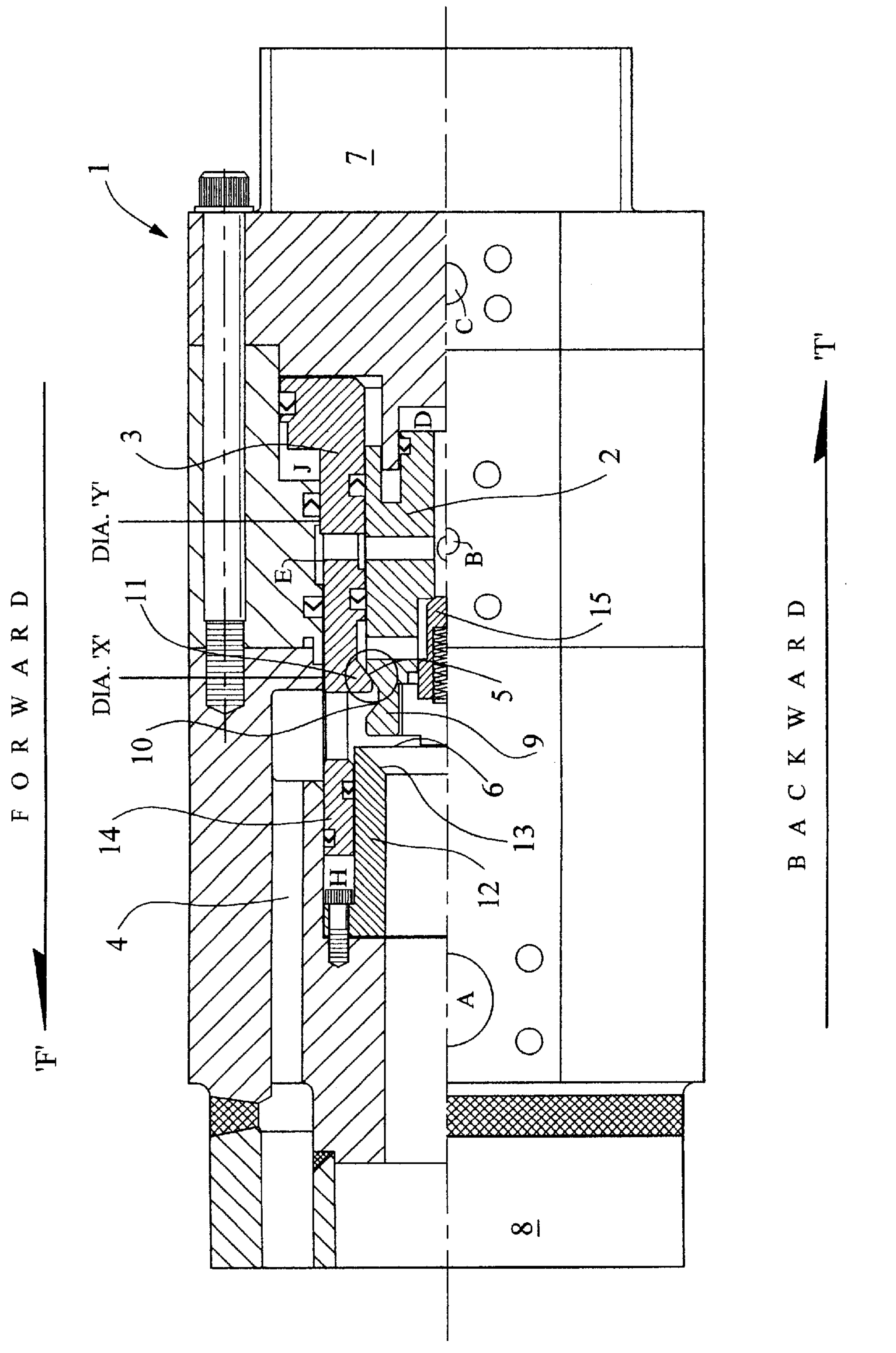
FIG. 1 is a part sectional view of a hydraulic control valve apparatus according to the invention, used in a piling hammer, in the rest position.

Referring to the drawings, there is shown a control valve apparatus 1 providing reciprocal motion, comprising a spool 2 and sleeve 3, a passage 4 for fluid, which is hydraulic fluid in the embodiment, the passage 4 being openable and closable by the spool 2 and sleeve 3, ports A, B, C, for fluid, and at least one seat 5, 6, the arrangement being such that a seat of one seal 5 reacts with a seat of another 6 whereby to open the another seal 6.

In the drawings the arrows 'R' show inlet fluid flow, and 'S' outlet field flow, shaded areas (FIGS. 2 and 3) showing high pressure fluid areas in the valve apparatus.

There are as mentioned, ports "A", "B" and "C", "A" being a low pressure port, "B" a high pressure input or inlet port, and "C" a pilot pressure input or inlet port. All the ports have a relatively large cross-sectional area in relation to fluid passages of the apparatus, whereby to prevent in the embodiment build-up of back pressure.

The valve apparatus 1 is positioned between an anchor 7 and the backward or lifting end of the hammer, and a cylinder 8 to which hydraulic fluid flows from the passage 4, to operate the piling hammer.

In the apparatus 1 the spool 2 and sleeve 3 are concentric, the spool 2 having a spool nose 9 and inboard thereof a seat device 10 with inclined seal surfaces in which is received a nose 11 of the sleeve, which sleeve nose 11 has an inclined surface complementary to the inclined surface of the seat device.

The sleeve and spool are slidable.

There is also a seal device 12 with an inclined surface 13 against which a complementary inclined surface of the spool nose 9 can seat.

The seal device 12 can include a slidable part 14 which slides adjacent to the seal device 12. A check valve 15 can be mounted under pressure of a bearing means, such as a spring.

The sleeve 3 has two parts of different diameter, at "X" and "Y" respectively.

Figure 2:
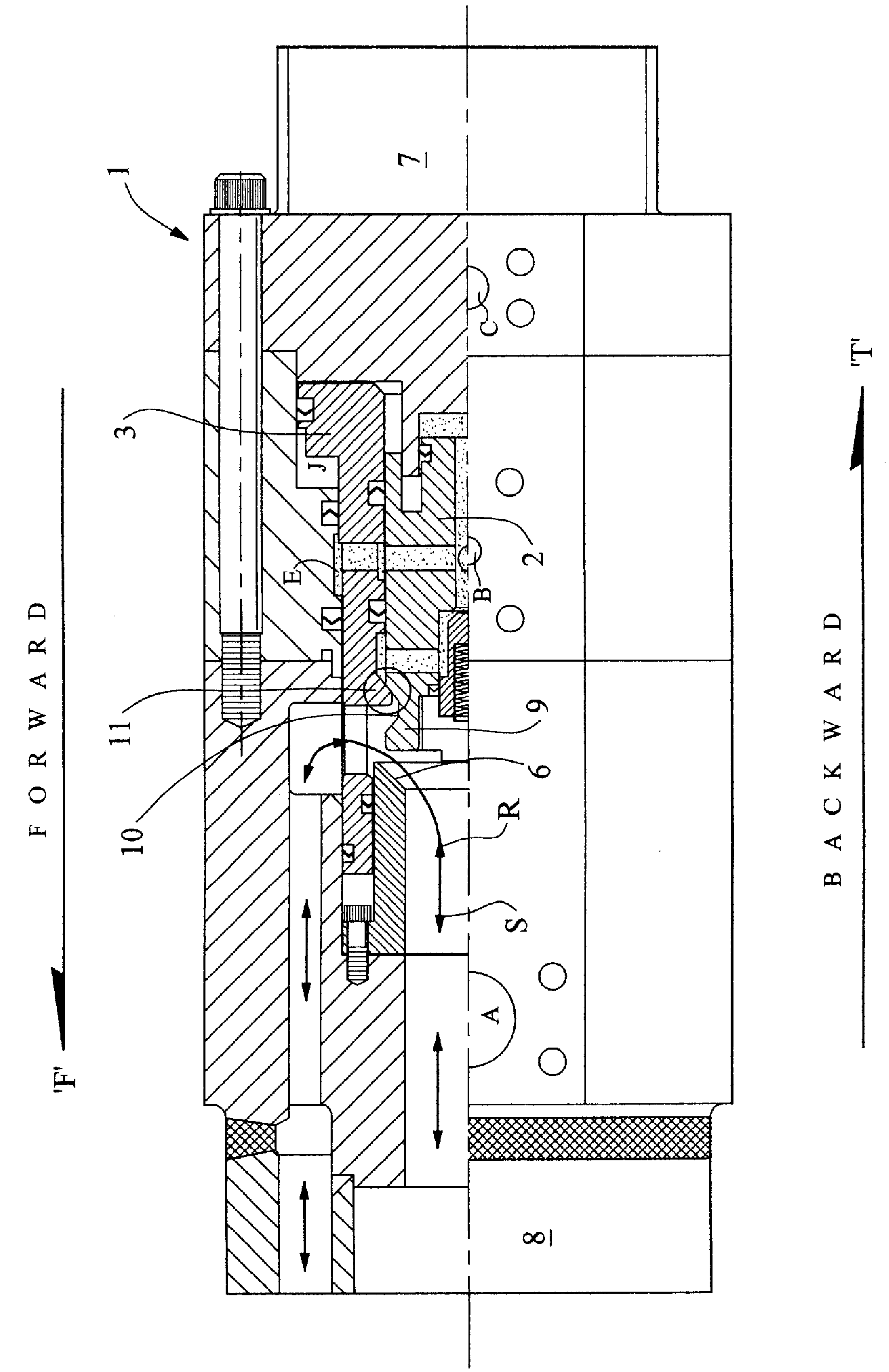
FIG. 2 shows the valve apparatus of FIG. 1 in the mode of either lifting (retarding) or dropping the hammer.
Figure 3:
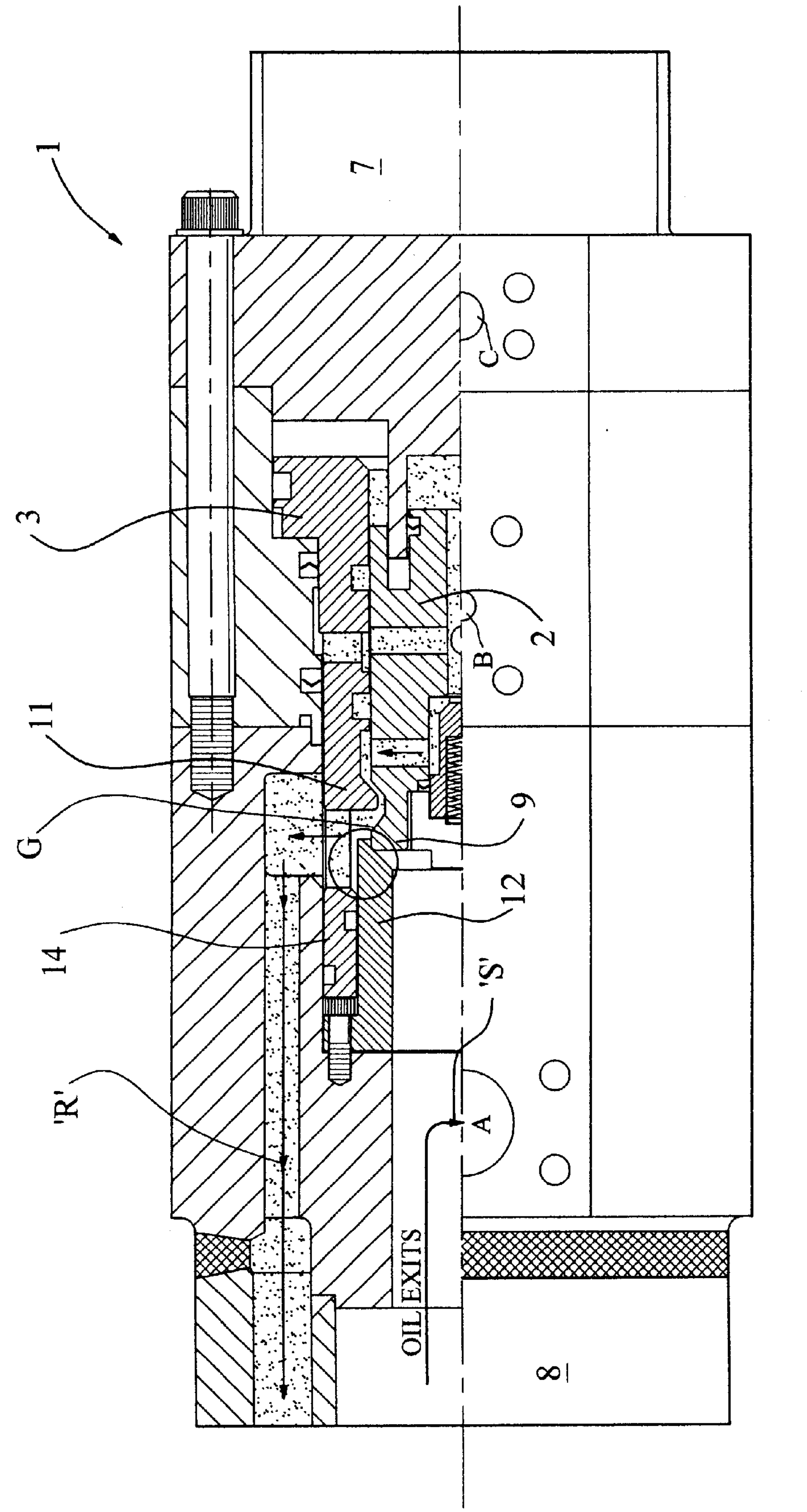
FIG. 3 shows the valve apparatus of FIGS. 1 and 2 in the lifting mode.

In use, and referring firstly to FIG. 1 when high pressure hydraulic fluid is applied at a port B, galleries "D" and "E" fill, and the check valve 15 therefore opens marginally ("cracks") at medium pressure, and stays open. Thus the galleries "D" and "E" are biassed and essentially act as hydraulic biassing means, or springs, at the system pressure, in other words the hydraulic pressure applied to the valve 1. The diameter "Y" is greater than the diameter "X", of the sleeve. Therefore, there is a constant hydraulic pressure (force) in the backward direction (arrow "T") on the sleeve 3. The area of the face of the spool 2 in the gallery "D" supplies a constant force to the spool in the forward direction (arrow "F"). In FIG. 2, the hammer is either retarding (backward direction, arrow "T"), or dropping under gravity (forward direction, arrows R,S). In this situation, hydraulic fluid (usually oil) is circulated through the valve apparatus as indicated by the arrow R,S. Low pressure is supplied internally through port "A" from an external source. The fluid pressure forces in galleries "D" and "E" maintain the engagement of the inclined complementary surfaces of the sleeve and spool at "F", with a force which is proportional to the hydraulic pressure in the system. To pass from the mode of FIG. 2 to that of FIG. 3, that is in a lifting mode of the valve apparatus 1, high pressure is required to be supplied to lift and accelerate the hammer. To achieve this, a pilot fluid pressure is supplied through port "C" from an external source. This acts on the area of a face of the spool 2 at the rear thereof, and decreases the force generated in gallery "E", which otherwise acts to maintain the spool; in the FIG. 2 position. The spool and sleeve then move to the loft (forward direction , arrow "F") as viewed, and the nose 11 of the sleeve 3 engages in the seat device and forces the spool 3 to the left (as viewed) to engage the valve seat at "G" and effect a seal which is energised by force generated in gallery "D".

At this instant the seal is effected at "G", the seal at 10 is disengaged or broken, and allows high pressure oil to pass down the passage to the cylinder, as indicated by the arrows "R".

On removal of pilot pressure from port "C", the sleeve 3 moves in a backward direction until the seal surfaces at 10 engage and the seal surfaces at "G" are simultaneously disengaged, so the spool and sleeve return together to the FIG. 2 mode, thus opening ports "A" and "B" for free flow of low pressure hydraulic oil.

It will be understood that during these operations, galleries "H" and "J" are vented to atmosphere.

It will also be understood that as no ports "A", "B" or "C" are scanned by seals, all the seals can be non-metallic, which saves on cost, weight and repair.

It will be further understood that using the invention, it is possible to provide virtually instantaneous switching between forward and backward movements, and vice-versa, with the following advantages of the valve apparatus described herein, with reference to the drawings, namely:

1) Instantaneous switching (no overlap or underlap);
2) Large ports pass oil quickly to avoid building back pressure;
3) All seals are non metallic, so that in the event of failure, migration will not cause consequential damaging to the machine as a whole; and
4) The valve has the possibility of zero leakage.

What is claimed is:

1. A control valve apparatus providing reciprocal motion between a spool and a sleeve, comprising:

the spool;

the sleeve;

a passage for fluid which can be opened and closed by the spool and the sleeve;

ports on the control valve which allow fluid to be provided to the passage; and at least one seal between a surface of the spool and a nose of the spool, wherein a seat of the at least one seal reacts with a seat of another seal, thereby opening the another seal.

2. The apparatus according to claim 1, wherein the spool has a seat device, and wherein the seat device and the sleeve are engageable for cutting off flow of fluid to the passage.

3. The apparatus according to claim 2, wherein the seat device comprises a groove in the spool in which the nose of the sleeve is received.

4. The apparatus according to claim 3, wherein the groove and the nose have cooperable sealing surfaces.

5. The apparatus according to claim 4, wherein the sealing surfaces being inclined surfaces.

6. The apparatus according to claim 3, wherein the spool has a nose adapted for sealing cooperation with the seat of at least one seal, for cutting off fluid flow from the passage to a fluid port.

7. The apparatus according to claim 6, wherein the seat of at least one seal and a nose of the spool have cooperable inclined surfaces for effecting sealing.

8. The apparatus according to claim 1, wherein the ports have a relatively large cross-sectional area in relation to the fluid flow passage whereby the building up of back fluid pressure in the fluid flow passage is obviated.

9. The apparatus according to claim 8, wherein the ports include a low pressure port, a high pressure inlet port, and a pilot pressure inlet port; and wherein the ports have a relatively large cross-sectional area in relation to the fluid flow passage, whereby the building up of back fluid pressure in the fluid flow passage is obviated.

10. The apparatus according to claim 1, wherein the fluid provided to the passage is hydraulic fluid.

11. The apparatus according to claim 1, wherein the sleeve has a body with parts of different diameter, whereby a substantially constant backward force is applied to the sleeve at system pressure.

12. The apparatus according to claim 11, wherein the spool has a face exposed to hydraulic fluid which is of an area to provide substantially constant force to the spool in a forward direction at system pressure.

13. The apparatus according to claim 1, wherein the at least one seal comprises a plastics material.

14. The apparatus according to claim 1, further comprising separate seal(s) and port(s), whereby no port is passed over by any seal.

15. The apparatus according to claim 1, further comprising a reciprocable device which provides reciprocal motion between the spool and the sleeve.

16. The apparatus according to claim 15, wherein the reciprocable device is a ram weight mass.

* * * * *

UNITED STATES PATENT AND TRADEMARK OFFICE

CERTIFICATE OF CORRECTION

PATENT NO. : 6,293,309 B1

DATED : September 25, 2001

INVENTOR(S) : Kok Yong Lim

It is certified that error appears in the above-identified patent and that said Letters Patent is hereby corrected as shown below:

Title page,

Item [56], in the References Cited, add the following:

-- 4,170,924 10/1979 Hunt --

FOREIGN PATENT DOCUMENTS

-- 2 221 418 02/1990 Great Britain 27 32 164 01/197 Germany 44 24 078 01/1996 Germany --

Column 2,

Line 36, replace “seat 5, 6” with -- seal 5, 6 --

Line 37, replace “of another 6” with -- of another seal 6 --

Column 3,

Line 31, replace “loft” with -- left --

Signed and Sealed this

Twenty-seventh Day of August, 2002

*Attest:*

JAMES E. ROGAN

*Attesting Officer*

*Director of the United States Patent and Trademark Office*